United States Patent
Kong

(10) Patent No.: US 9,364,971 B2
(45) Date of Patent: Jun. 14, 2016

(54) SEALING APPARATUS AND METHOD OF FOAM INJECTION MOLD

(71) Applicants: Hyundai Motor Company, Seoul (KR); Kia Motors Corporation, Seoul (KR)

(72) Inventor: Byung Seok Kong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 432 days.

(21) Appl. No.: 13/909,346

(22) Filed: Jun. 4, 2013

(65) Prior Publication Data

US 2014/0167306 A1 Jun. 19, 2014

(30) Foreign Application Priority Data

Dec. 18, 2012 (KR) .......................... 10-2012-0148060

(51) Int. Cl.
| | |
|---|---|
| *B29C 44/08* | (2006.01) |
| *B29C 33/00* | (2006.01) |
| *B29C 44/12* | (2006.01) |
| *B29C 44/34* | (2006.01) |
| *B29L 31/30* | (2006.01) |
| *B29K 23/00* | (2006.01) |
| *B29K 75/00* | (2006.01) |

(52) U.S. Cl.
CPC .............. *B29C 33/0038* (2013.01); *B29C 44/08* (2013.01); *B29C 44/1228* (2013.01); *B29C 44/351* (2013.01); *B29K 2023/12* (2013.01); *B29K 2075/00* (2013.01); *B29L 2031/3005* (2013.01)

(58) Field of Classification Search
None
See application file for complete search history.

(56) References Cited

U.S. PATENT DOCUMENTS

| 8,932,038 B2 * | 1/2015 | Kong | .................. | B29C 45/2608 425/112 |
| 2014/0161923 A1 * | 6/2014 | Kong | .................. | B29C 45/2608 425/515 |

FOREIGN PATENT DOCUMENTS

| JP | 06328468 | 11/1994 |
|---|---|---|
| KR | 10-2002-0035549 | 5/2002 |
| KR | 10-2004-0035170 | 4/2004 |
| KR | 10-2004-0042676 | 5/2004 |
| KR | 10-0633244 | 9/2004 |
| KR | 10-0633764 | 9/2005 |

* cited by examiner

*Primary Examiner* — Ryan Ochylski
(74) *Attorney, Agent, or Firm* — Mintz Levin Cohn Ferris Glovsky and Popeo, P.C.; Peter F. Corless

(57) ABSTRACT

A sealing apparatus of a foam injection mold that includes an upper mold that is disposed on an upper side as a movable mold to inject a core and a vacuum forming mold to form a skin. The upper mold and the vacuum forming mold are operated integrally and a lower mold is used during injection-molding and foaming of the core. A resilient sealing unit is integrally formed with the core when the core is injection-molded between the upper mold and the lower mold, to attach the core and the skin while the lower mold in which the core is formed and the vacuum forming mold in which the skin is formed are combined using a resilient restoring force. The resilient sealing unit seals a foaming space between the core and the skin.

11 Claims, 5 Drawing Sheets

SEALING APPARATUS AND METHOD OF FOAM INJECTION MOLD

CROSS-REFERENCE TO RELATED APPLICATION

This application claims under 35 U.S.C. §119(a) the benefit of Korean Patent Application No. 10-2012-0148060 filed Dec. 18, 2012, the entire contents of which are incorporated herein by reference.

BACKGROUND (a) Technical Field

The present invention relates to a sealing apparatus for a foam injection mold, and more particularly to a sealing apparatus that seals a foaming space between a core and a skin in a foam injection molding machine that manufactures a product having a foaming layer between the core and the skin to prevent leakage of a foaming liquid.

(b) Background Art

In general, crash pads that safely protect a passenger when the passenger collides due to an accident and the like are installed on front inner sides of a driver seat and a passenger seat as interior materials installed on a front side of an interior of a vehicle. Such a crash pad is manufactured to have an appealing surface in terms of external appearance while showing a resiliently cushioning performance and a property of absorbing an impact to some degree, by using a foam material.

Generally, a crash pad for a vehicle includes a skin which is a material that provides an appealing surface state, and a core operating as a frame of the crash pad on an inner side of the skin. A foam layer, such as a polypropylene (PP) foam layer, a polyurethane (PU) foam layer, and the like, that provide a cushioning performance and an impact absorbing performance is interposed between the skin and the base.

FIGS. 1A to 1D are exemplary views showing processes for manufacturing a crash pad according to the related art. A core 1 is formed through polymer injection molding, a skin 2 is formed through vacuum absorption, and a foam layer 3 is formed through foaming. The processes will be described below.

First, the core 1 is formed by injecting a polymeric resin material 1a into an injection mold including an upper mold 4 and a lower mold 5 (FIG. 1A), and the skin 2 separately preheated in a male vacuum-forming mold 6 is inserted into the injection mold to be formed through vacuum absorption (FIG. 1B). In particular, although not shown in the drawings, vacuum apertures that vacuum absorb the skin 2 are formed in the vacuum-forming mold 6, and the vacuum apertures are connected to one passageway in the mold, and then is connected to an external large capacity vacuum pump.

Further, after a foaming liquid 3a is injected into a core 1 of the lower mold 5, the foaming upper mold 7 to which the skin 2 is attached is closed and the skin 2 attached to the upper mold 7 is pressed and bonded onto the foaming liquid 3a of the lower mold 5. Thereafter, the skin 2 and an unnecessary marginal portion (e.g., a portion formed by the leaked foaming liquid and the like) of the foam layer 3 are cut off and removed together (e.g., trimmed), and a peripheral portion of the skin 2 is surrounded by the foam layer 3 and is bonded and fixed to the core 1 using an adhesive.

However, the manufacturing method according to the related art has the following problems.

First, since the core 1, the skin 2, and the foam layer 3 are formed separately in different molds, a total of three molds are required (e.g., core injecting-molding upper and lower molds, a vacuum-forming mold, and a foaming upper mold), which increases investment costs such as mold costs and manufacturing costs.

Further, since a peripheral portion of a cavity is opened when the lower mold 5 and the foaming upper mold 7 are closed, the foaming liquid may leak through the opened peripheral portion (e.g., an excessive loss of the foaming liquid and an increase in manufacturing costs may be caused).

Additionally, as shown in FIG. 1D, after the manufacturing process is completed, a separate process of separately cutting off a marginal portion formed by the solidified leaked liquid and a marginal portion of the skin 2 or cutting off only the leaked portion, surrounding the cut portion with a peripheral portion of the skin 2, and bonding the peripheral portion of the skin 2 to the cut portion is necessary.

Further, since the foaming liquid is injected into the opened cavity space (e.g., foaming space), a temperature of the injected foaming liquid must be controlled and maintained within a predetermined temperature range, which may be difficult.

In addition, a minimum thickness of the foaming layer 3 should be designed to be a predetermined thickness (e.g., 5 mm) or larger due to the solidification of the foaming liquid in a structure in which the foaming space is opened and the foaming liquid leaks, which may lower a degree of freedom of the crash pad.

Therefore, a molding apparatus has been developed in which a vacuum-forming mold and a foaming upper mold are integrated in the same mold and a peripheral portion of a skin may be attached to a core by a slider mold to seal a foaming space. The method reduces the number of molds, costs, and the cost price, solves an excessive loss of the foaming liquid, and improves a degree of freedom of design of the crash pad.

FIG. 2 is an exemplary schematic view showing a foam injection molding apparatus including a slider mold that prevents a leakage of a foaming liquid according to the related art, and a crash pad may be manufactured through IMG (In-Mold Grain) foam injection molding in the shown crash pad manufacturing apparatus. Specifically, an IMG foaming method refers to a method of forming an embossment on an inner surface of a mold (e.g., vacuum-forming mold) that forms a skin (e.g., formed of a Thermoplastic Olefin (TPO) material), and forms the skin through heating of the skin and suctioning of vacuum into a mold and forms an embossed shape on a surface of the skin.

As shown, the core 1 is formed by injecting a resin into a mold while the core injecting molds 10 and 11 are combined, and the skin 2 is vacuum-absorbed in the vacuum-forming mold 12 to be formed at the same time. Next, the mold is rotated and fed by an upper rotation unit to combine the vacuum-forming mold 12 in which the skin 2 is formed with the lower mold 11 in which the core 1 is formed, and then the foaming liquid is injected and foamed between the core 1 and the skin 2 to form the foam layer 3.

When the foaming liquid is injected, the slider mold 12a seals the foaming space by attaching a peripheral portion of the skin 2, and then the slider mold 12a moves forward by a distance suitable to form a seal during the foaming operation and then is fixed to maintain the seal. The slider mold 12a moves rearward to eject a product after the foaming operation.

Then, as shown in FIG. 3, the sealing operation is performed while a sealing boss 1c formed in the core 1 overlaps the skin 2, and thus preventing the foaming liquid from leaking to the exterior of the mold by the sealing boss 1c. The molding apparatus prevents leakage of a foaming liquid to some degree, and shares a mold, thereby reducing the number of molds, mold costs, invest costs, and the cost price.

However, to prevent leakage of the foaming liquid, an amount of the overlapping portion between the sealing boss 1c and the skin 2 should be maintained at a predetermined level (e.g., 0.3 mm) or higher and no gap should be generated between the sealing boss 1c and the skin 2. However, due to mold tolerances a and a' and contractions b and c of materials indicated in FIG. 3, a gap may be generated between the sealing boss 1c and the skin 2. Accordingly, the foaming liquid leaks in the foaming process thereby, causing inconsistencies in the foaming pressure and foaming amount, and the leaked foaming liquid may be stuck to the mold, bonding the product to the mold, causing difficulty in ejecting the product.

SUMMARY

The present invention provides a sealing apparatus that may substantially eliminate a gap between a core and a skin due to a tolerance of a mold or contraction of a material during foam injection molding of a crash pad and the like, thereby preventing leakage of a foaming liquid.

In accordance with an aspect of the present invention, a sealing apparatus of a foam injection mold, may include: an upper mold disposed on an upper side as a movable mold, that injects a core and a vacuum forming mold to form a skin, wherein the upper mold and the vacuum forming mold may be operated integrally; a lower mold used during injection-molding and foaming of the core; and a resilient sealing unit integrally formed with the core when the core is injection-molded between the upper mold and the lower mold, that attaches the core and the skin while the lower mold in which the core is formed and the vacuum forming mold in which the skin is formed are combined by using a resilient restoring force, wherein the resilient sealing unit seals a foaming space between the core and the skin.

In an embodiment of the present invention, the resilient sealing unit may be continuously formed along a periphery of the core to attach a periphery of the core and a periphery of the skin.

In another embodiment of the present invention, the resilient sealing unit may include a sealing boss formed at a periphery of the core and attached to the skin, and a resiliently deformed unit formed concavely at a lower end of a periphery of the core and provides a resilient restoring force to attach the sealing boss and the skin when the lower mold and the vacuum forming mold are combined.

In still another embodiment of the present invention, the sealing apparatus may further include: a slider mold installed in the lower mold to be vertically moved, wherein the resiliently deformed recess may be formed as the slider mold rises when the core is injection-molded and a space is formed in the resiliently deformed recess as the slider mold descends during foam forming to provide a resilient restoring force to overlap the sealing boss protruding toward the core and the skin.

In a further embodiment of the present invention, an upper end of the slider mold may have a triangular or wedge like cross section to be sharp to allow the slider mold to be retreated from the resiliently deformed recess and the resiliently deformed recess to be resiliently deformed.

In a still further embodiment of the present invention, the slider mold may be operated by a hydraulic or pneumatic cylinder mechanism.

In a yet further embodiment of the present invention, the resilient sealing unit may be a resilient boss protruding from a periphery of the core and resiliently deformed to be folded while contacting the skin when the vacuum forming mold is combined, and the core and the skin overlap due to a resilient restoring force of the resilient boss. The resilient boss may have a circular curved portion protruding laterally from an outer surface of the core to allow a smooth slide contact between the resilient boss and the skin. Furthermore, the resilient boss may have an attaching boss protruding laterally from a lower end thereof to increase an attaching force between the core and the skin.

The sealing apparatus of a foam injection mold according to the present invention has the following advantages.

According to the sealing apparatus of the present invention, a peripheral portion of a foaming space may be sealed by a resilient structure of the core which may be resiliently deformed when a crash pad and the like is foam injection-molded, and accordingly, a leak of a foaming liquid may be prevented.

In particular, a defined amount of an overlapping portion may be maintained by substantially removing a gap between the core and the skin due to a tolerance of the mold and contraction of a material, and leakage of the foaming liquid may be prevented.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
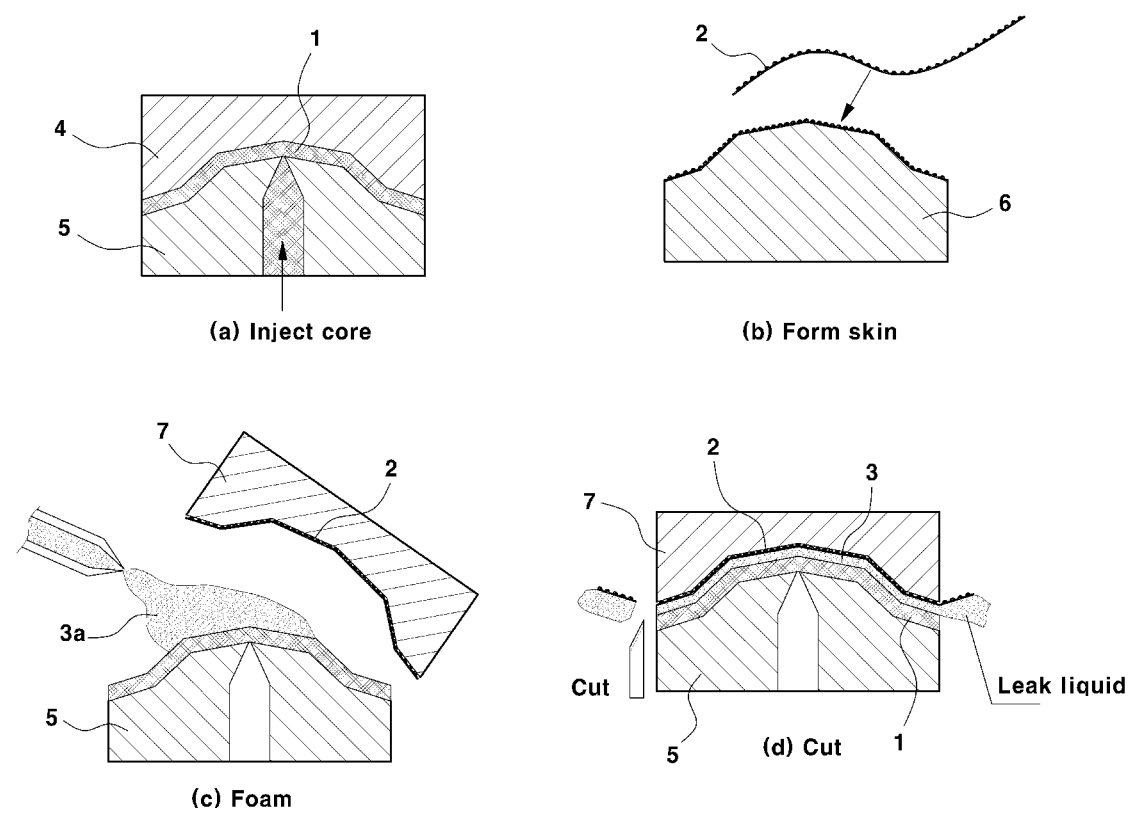
FIG. 1A to 1D are exemplary views showing processes for manufacturing a crash pad according to the related art.

It should be understood that the accompanying drawings are not necessarily to scale, presenting a somewhat simplified representation of various exemplary features illustrative of the basic principles of the invention. The specific design features of the present invention as disclosed herein, including, e.g., specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings so that those skilled in the art to which the present invention pertains can easily carry out the invention.

A sealing apparatus of the present invention may be configured to injection mold a core of a polymeric resin, vacuum form a skin, inject a foaming liquid between the formed core and the skin to foam a foam layer, and manufacture a product having the foaming layer between the core and the skin. In particular, the product may be a crash pad, and the present invention may be applied to a molding apparatus for manufacturing a crash pad through an IMG (In-Mold Grain) foam injection molding method.

Figure 2:
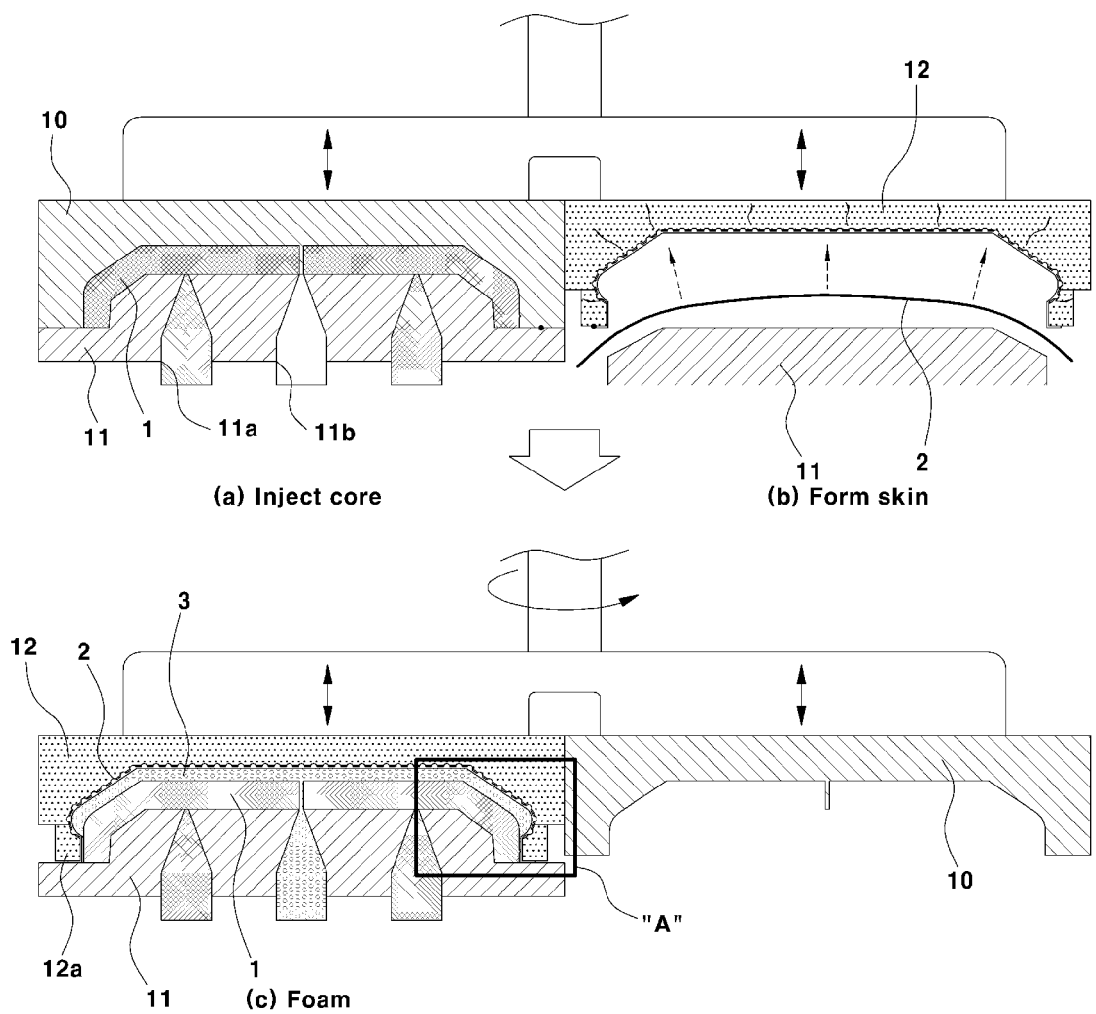
FIG. 2 is an exemplary view showing a foam injection molding apparatus including a slider mold that prevents leakage of a foaming liquid according to the related art.
Figure 3:
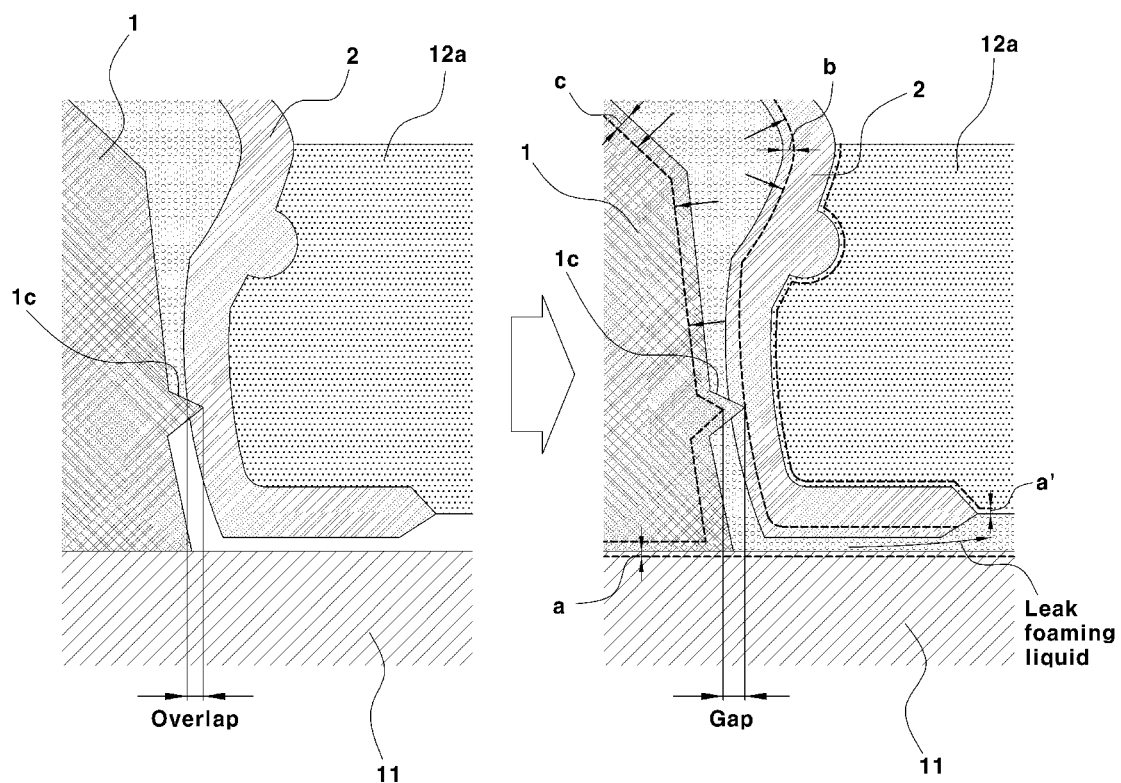
FIG. 3 is an exemplary detailed view of part A of FIG. 2 according to the related art.

Further, the foam injection molding apparatus may include an upper mold and a lower mold that may form a core as a resin is injected into a core forming space formed while the upper mold and the lower mold are combined, and a vacuum-forming mold that may vacuum forms a skin (see FIG. 2).

In addition, the foam injection molding apparatus may be a molding apparatus that forms a foaming space between a skin and a core of a lower mold when a vacuum forming mold to which a formed skin is attached and the lower mold are combined, the lower mold including an injection passageway for injecting a molten resin into the core forming space, and a foaming liquid injecting passageway for injecting a foaming liquid into the foaming space may be used to allow the lower mold to be used as a foaming mold together with the vacuum forming mold.

Further, the foam injection molding apparatus may be a molding apparatus in which a mold is rotated and fed by an upper rotation unit to allow an upper mold for injecting a core and a vacuum forming mold for forming a skin and foam forming to be alternately combined with a lower mold.

The configuration of the foam injection molding apparatus is not different from the conventional apparatus shown in FIG. 2, and a sealing apparatus that seals a foaming space to prevent leakage of a foaming liquid according to the present invention will be described in detail below.

The sealing apparatus of the present invention may be configured to attach a skin to a core during a foaming process to seal a foaming space between the core and the skin, and may maintain an amount of an overlapping portion between a sealing boss of the core and the skin when the skin is combined with the core while substantially eliminating a gap between the core and the skin due to mold tolerances and contraction of materials (e.g., the gap may be substantially eliminated through resilient restoration of a resiliently deformed portion when the gap is generated).

In particular, the sealing apparatus may include a resilient sealing unit that attaches a peripheral portion of the core to the skin using a resilient restoring force to seal a foaming space between the core and the skin, and may substantially eliminate a gap when the gap is generated due to contraction c of a material and a mold tolerance b to maintain a predetermined amount of an overlapping portion.

Figure 4:
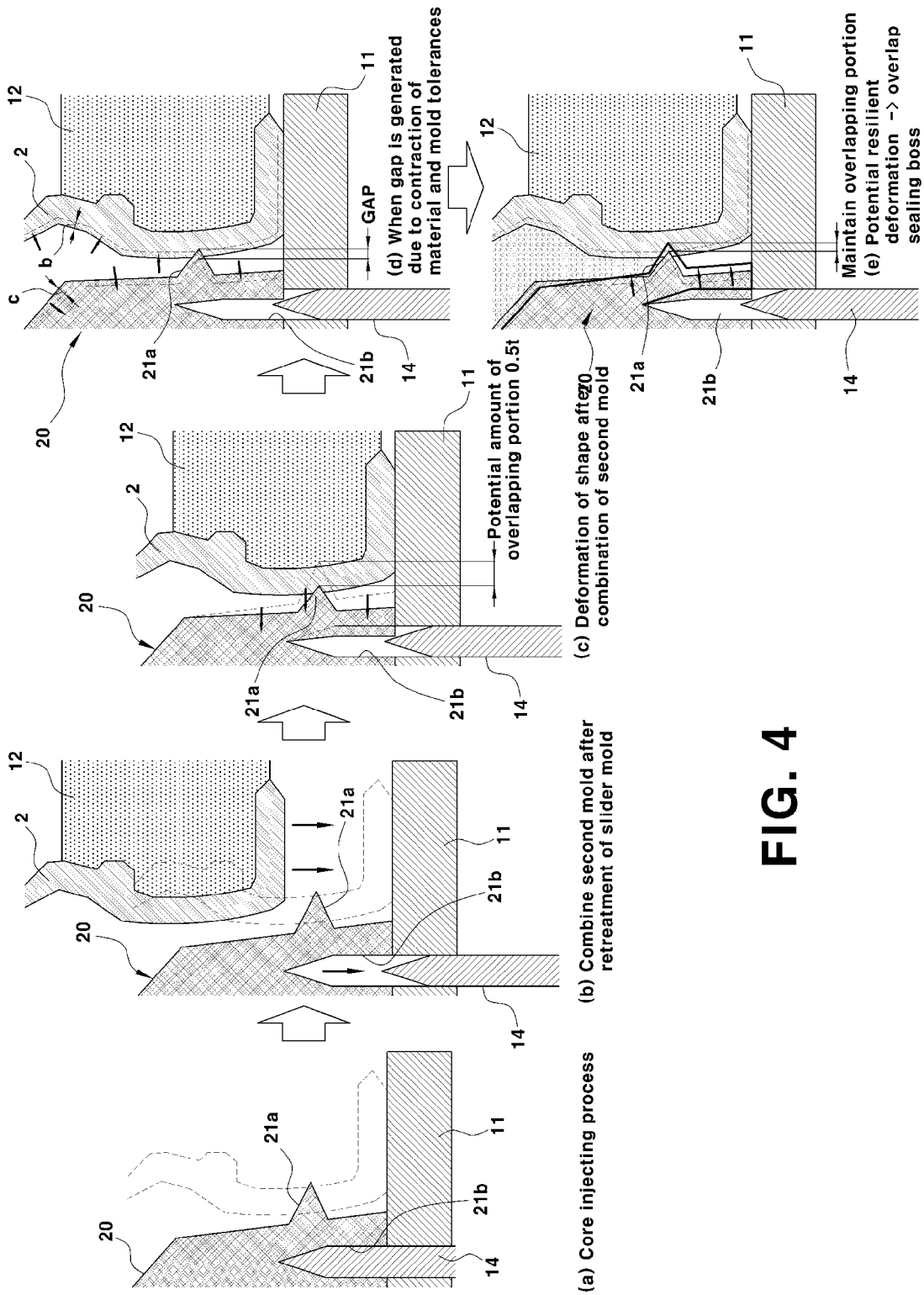
FIG. 4 shows exemplary sectional views of a sealing apparatus at a peripheral portion of a foaming space to which A type resilient deformation is applied according to an exemplary embodiment of the present invention.

FIG. 4 shows exemplary sectional views of a sealing apparatus at a peripheral portion of a foaming space to which A type resilient deformation may be applied according to an embodiment of the present invention. Hereinafter, the sealing apparatus of FIG. 4 will be described.

FIG. 4A a core 20 formed in a lower mold 11 in a core injection process, FIG. 4B a vacuum forming mold 12 to which a skin 2 may be attached combined after a slider mold 14 is retreated, FIG. 4C a resiliently deformed recess 21b deformed when the vacuum forming mold 12 and the lower mold 11 are combined, FIG. 4D shows a sealing boss 21a and the skin indicted by dotted lines when a gap is generated due to contraction (indicated by a dotted line) of a material and a mold tolerance before a foaming liquid is injected when the vacuum forming mold 12 and the lower mold 11 are combined, and FIG. 4E shows an overlap maintained by a resilient restoring force of the resiliently deformed recess 21b when the vacuum forming mold 12 and the lower mold 11 are combined.

Hereinafter, in the specification, the lower mold 11 in which the core 1 may be formed will be referred to as a first mold, and the vacuum forming mold 12 to which the skin 2 may be attached will be referred to as a second mold.

As shown in FIG. 4A, as an exemplary resilient sealing unit, the resiliently deformed recess 21b concavely formed from a lower end of a periphery of the core toward an upper inner side may be applied. The resiliently deformed recess 21b may be a space formed in the core 20. When an external force is applied to the resiliently deformed recess 21b, a portion of the resiliently deformed recess 21b may be deformed thus, reducing a volume of the resiliently deformed recess 21b, whereas when the external force is released, the resiliently deformed recess 21b may be restored to an original position. Specifically, an upper end of the resiliently deformed recess 21b may be blocked, an opening may be formed at a lower end of the resiliently deformed recess 21b, a vertical depth of the resiliently deformed recess 21b may be substantially large compared to a lateral width thereof, the resiliently deformed recess 21b may be compressed laterally when a lateral force is applied to the opening from an outer side thereof, and the resiliently deformed recess 21b may be restored to the original position when the lateral force is released.

The resiliently deformed recess 21b may be formed by the slider mold 14 during a core injecting process. The slider mold 14 may be installed in the first mold 11 to be vertically moved, and when the slider mold 14 protrudes into a core forming space (e.g., cavity) when the core 20 is injection-molded, the resiliently deformed recess 21b may be formed to correspond to the shape of the slider mold 14. The slider mold 14 may be continuously formed along a periphery of the core 20, and an upper end of the slider mold 14 may be formed to be substantially sharp (e.g., a cross-section of the upper end of the slider mold 14 is triangular or wedge-shaped).

When the upper end of the slider mold 14 has a triangular or wedge-like shape, the slider mold 14 may be retreated from the resiliently deformed recess 21b after the core is formed, and the resiliently deformed recess 21b may be resiliently deformed inward with respect to an apex of an upper end thereof when a lateral pressing force is applied to an outer surface of the resiliently deformed recess 21b. The slider mold 14 may be vertically operated by a separate drive mechanism. The drive mechanism may be a cylinder mechanism that may include a cylinder body in which oil or compression air may be stored as a working fluid, and a piston rod operated forward and rearward in the cylinder body. The cylinder mechanism may be controlled by a control signal received from a controller, and a piston rod may protrude upward when the core is injection molded and the slider mold 14 connected to a piston rod protrudes into the core forming space in the first mold 11.

In the core injection molding process, after the upper mold is fed to and combined with the first mold (e.g., lower mold) 11, the slider mold 14 may protrude into the core forming space, and as a melted resin is injected into the remaining space other than a volume of the protruding slider mold 14, the core 20 may be formed to allow the resiliently deformed recess 21b to be concavely formed at a lower end of a periphery of the core 20.

Further, a sealing boss groove may be continuously formed in the upper mold to injection mold the core 20 along a periphery of an upper surface of the core forming space, and the melted resin may be injected into the sealing boss groove and the core forming space when the core 20 is injection-molded to allow the sealing boss 21a to continuously protrude laterally on an outer surface of a periphery of the core. Additionally, an initial amount of overlapping between the sealing boss 21a and the skin 2 may become about 0.8 mm.

Further, after the core 20 is formed through injection-molding and the skin is formed through vacuum absorption in the second mold 12, the second mold 12 in which the skin is formed may be rotated 180 degrees alternately with the upper mold to cause the second mold and the upper mold to switch positions.

Moreover, as shown in FIG. 4B, after the slider mold 14 is retreated downward, the second mold 12 in which the skin 2 is formed may be moved downward to be combined with the first mold 11.

Subsequently, as shown in FIG. 4C, the sealing boss 21a may be pressed as the second mold 12 is moved, and as a lateral force is transferred from the exterior through the sealing boss 21a, the resiliently deformed recess 21b may be laterally compressed and deformed. When the skin 20 of the second mold 12 presses the sealing boss 21a of the core 20, an amount of overlapping between the skin 20 and the sealing boss 21a may be maintained at about 0.2 mm and a potential amount of overlapping of about 0.5 mm (=−0.8 mm−0.3 mm). Under an assumption that when the second mold 12 is combined, a general amount of overlapping between the skin and the sealing boss 21a is about 0.3 mm and a maximum value of a gap generated due to contraction of the material and a mold tolerance is about 0.5 mm, the potential amount of overlapping refers to an amount of overlapping that may be potentially overlapped by further attaching the sealing boss 21a to the skin by a maximum value of the gap through the resiliently restoring force of the resiliently deformed recess 21b.

When a gap is generated due to contraction of the material and a mold tolerance as shown in FIG. 4D, the compressed and deformed resiliently deformed recess 21b may expand to be deformed outward by the gap due to the resilient force, and as indicated by a thick line of FIG. 4E, by attaching the sealing boss 21a to the skin 2 (dotted line), the gap generated due to the contraction of a material and a mold tolerance may be substantially removed, a foaming space between the core 20 (thick line) and the skin 2 (dotted line) may be sealed, and an amount of overlapping between the sealing boss 21a (thick line) and the skin 2 (dotted line) may be maintained at about 0.3 mm.

Figure 5:
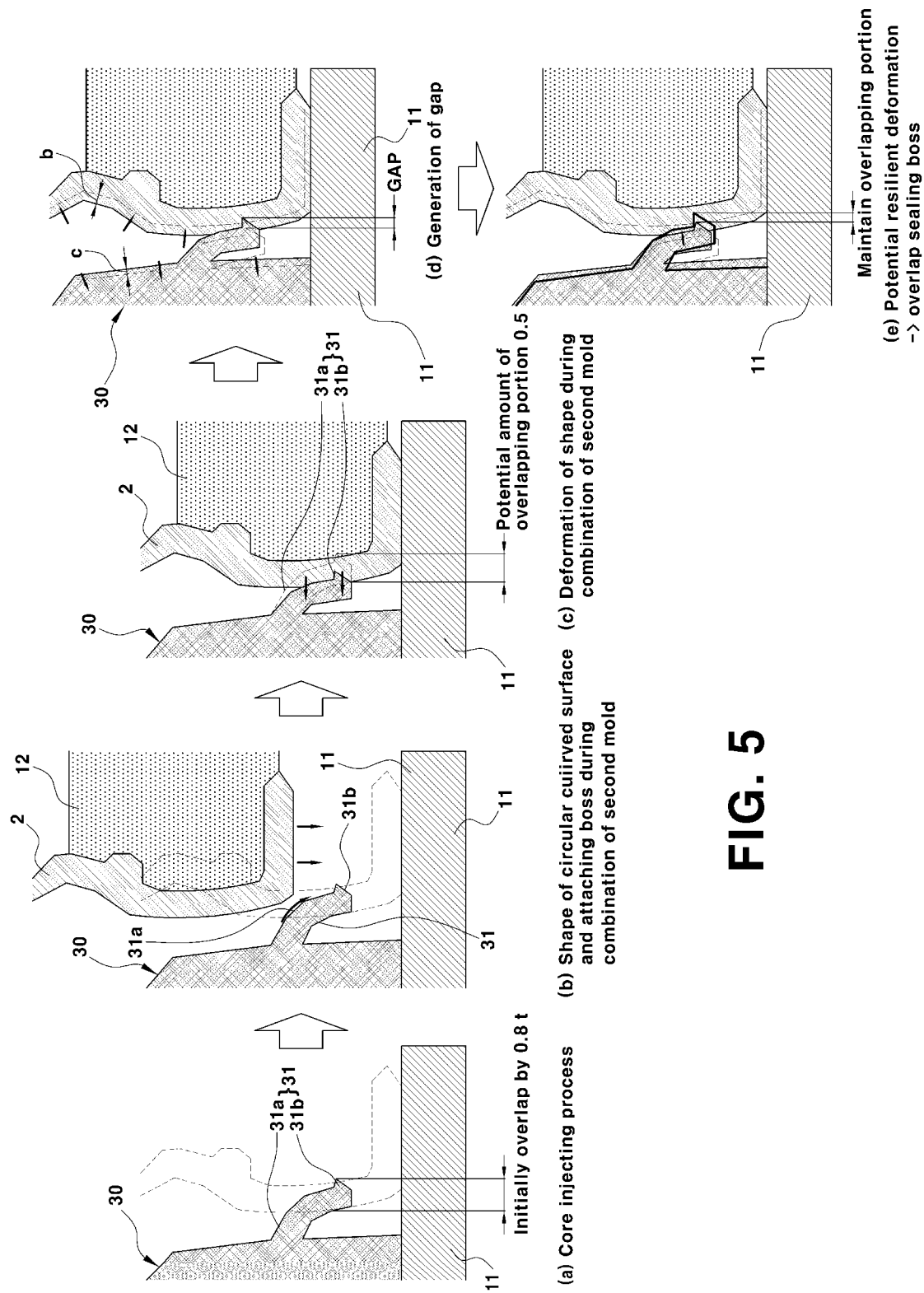
FIG. 5 shows exemplary sectional views of sealing apparatus at a peripheral portion of a foaming space to which a B type resiliently sealing unit is applied according to another exemplary embodiment of the present invention.

FIG. 5 shows exemplary views of a sealing apparatus at a periphery of a foaming space to which a B type resilient sealing unit is applied according to another exemplary embodiment of the present invention, and the sealing apparatus will be described below with reference to FIG. 5.

FIG. 5A shows a core 30 formed in a first mold 11 in a core injecting process, FIG. 5B shows a second mold 12 to which a skin 2 is attached combined with the first mold 11, FIG. 5C shows a resilient boss 31 of the core 20 deformed when the first and second molds 11 and 12 are combined, FIG. 5D shows the resilient boss 31 and the skin 2 indicated by dotted lines when a gap is generated due to contraction (indicated by a dotted line) of a mold and a mold tolerance before a foaming liquid is injected while the second mold 12 is combined with the second mold 11, and FIG. 5E shows the overlap being maintained by a resilient restoring force of the resilient boss 31 while the second mold 12 is combined with the first mold 11.

As shown in FIG. 5A, as another example of the resilient sealing unit, a resilient boss 31 may continuously protrude on an outer surface thereof along a periphery of the core 30. The resilient boss 31 may be integrally formed laterally from a periphery of the core 30 during a core injecting process, and when a lateral force is applied to the resilient boss 31 from the exterior, the resilient boss 31 may be folded downward, and when the external force is released, the resilient boss 31 may be restored to an original shape to close the foaming space between the core 30 and the skin 2 during the foaming process and an amount of overlapping between the core 30 and the skin may be maintained at a predetermined value. In particular, although not shown, a resilient boss recess may be continuously formed along a periphery of the upper mold on an inner surface of the upper mold for injection-molding of the core 30.

In the core injecting process, when a melted resin for injecting the core 30 is injected into the core forming space, the melted resin may be injected into the resilient boss recess of the upper mold and the core forming space to allow the resilient boss 31 to be continuously formed along a periphery of the core 30.

In the cross-sectional shape of the resilient boss 31 according to the embodiment of the present invention with reference to the vertical cross-section at periphery of the core 30, the resilient boss 31 may have a circular curved portion 31a protruding laterally from an outer surface of the core. Then, the circular curved portion 31a may be formed along a lower inner side or along a lower outer side from a side surface of the core 30. Although the circular curved portion 31a has been described to protrude laterally from a side surface of the core 30, the present invention is not limited thereto but may be formed to be inclined in an inclined plane form.

However, when the circular curved portion 31a is formed laterally, a smooth slide contact with the skin 2 may be guided while the skin 2 presses an upper portion of the circular curved portion 31a downward as the second mold 12 is moved downward, and a force may be transferred to the circular curved portion 31a, and the circular curved portion 31a may be easily. Further, since an attaching boss 31b protrudes laterally from a lower end of the circular curved portion 31a, the attaching boss 31b may increase an attaching force between the core 30 and the skin 2 when the first and second molds 11 and 12 are combined. Then, the resilient boss 31 may directly contact the skin 2, and an initial amount of overlapping between the resilient boss 31 and the skin may be set, e.g., to about 0.8 mm.

After the skin 20 is formed simultaneously as the core 30 is injection-molded, the skin may be rotated by 180 degrees by a rotation unit before the first and second molds 11 and 12 are combined to cause the upper mold for injection-molding the core and the second mold 12 for forming the skin switch positions.

Furthermore, as shown in FIG. 5B, as the second mold 12 in which the skin 2 is formed descends, the second mold may combine with the first mold 11 in which the core 30 is formed. When the first and second molds 11 and 12 are combined, the skin 2 may contract an upper portion of the resilient protrusion 31 protruding from a periphery of the core 30 and press the resilient boss 31 downward at the same time.

Moreover, as shown in FIG. 5C, when the first and second molds 11 and 12 are combined, the resilient boss 31 may be pressed by the skin 2 to be folded toward a lower inner side and may be resiliently deformed. Then, when the second mold 12 is combined with the first mold, an amount of overlapping between the skin 2 and the resilient boss 31 may be maintained at about 0.3 mm, and a potential amount of overlapping between the resilient boss 31 and the skin 2 by the resilient restoring force of the resilient boss 31 when a gap is generated due to contraction of a material and a mold tolerance may be about 0.5 mm (=0.8 mm−0.3 mm).

When a gap is generated due to contraction of a material and a mold tolerance as shown in FIG. 5D, the folded resilient boss 31 may be deployed outward by the gap due to the resilient restoring force, and as the resilient boss 31 may be attached to the skin 2 (dotted line) as indicated by a thick line of FIG. 5E, the gap generated due to contraction of the material and the mold tolerance may be substantially removed, a foaming space between the core 30 (thick line) and the skin 2 (dotted line) may be sealed, and an amount of overlapping between the resilient boss 31 (thick line) and the skin 2 (dotted line) may be maintained at about 0.3 mm.

The invention has been described in detail with reference to exemplary embodiments thereof. However, it will be appreciated by those skilled in the art that changes may be made in these embodiments without departing from the principles and spirit of the invention, the scope of which is defined in the accompanying claims and their equivalents.

What is claimed is:

1. A sealing apparatus of a foam injection mold comprising:
    an upper mold disposed on an upper side and operates as a movable mold to inject a core and a vacuum forming mold to form a skin, wherein the upper mold and the vacuum forming mold are operated integrally;
    a lower mold used during injection-molding and foaming of the core; and
    a resilient sealing unit integrally formed with the core when the core is injection-molded between the upper mold and the lower mold, to attach the core and the skin while the lower mold in which the core is formed and the vacuum forming mold in which the skin is formed are combined using a resilient restoring force,
    wherein the resilient sealing unit seals a foaming space between the core and the skin.

2. The sealing apparatus of claim 1, wherein the resilient sealing unit is continuously formed along a periphery of the core to attach a periphery of the core and a periphery of the skin.

3. The sealing apparatus of claim 1, wherein the resilient sealing unit further includes:
    a sealing boss formed at a periphery of the core and attached to the skin; and
    a resiliently deformed unit formed concavely at a lower end of a periphery of the core to provide a resilient restoring force to attach the sealing boss and the skin when the lower mold and the vacuum forming mold are combined.

4. The sealing apparatus of claim 3, further comprising:
    a slider mold installed in the lower mold to be vertically moved, wherein the resiliently deformed recess is formed as the slider mold rises when the core is injection-molded and a space is formed in the resiliently deformed recess as the slider mold descends during foam forming and a resilient restoring force is provided to overlap the sealing boss protruding toward the core and the skin.

5. The sealing apparatus of claim 4, wherein an upper end of the slider mold has a triangular or wedge-like cross section to allow the slider mold to be retreated from the resiliently deformed recess and the resiliently deformed recess to be resiliently deformed.

6. The sealing apparatus of claim 4, wherein the slider mold is operated by a hydraulic or pneumatic cylinder mechanism.

7. The sealing apparatus of claim 1, wherein the resilient sealing unit is a resilient boss protruding from a periphery of the core and resiliently deformed to be folded while contacting the skin when the vacuum forming mold is combined, and the core and the skin overlap due to a resilient restoring force of the resilient boss.

8. The sealing apparatus of claim 7, wherein the resilient boss has a circular curved portion protruding laterally from an outer surface of the core to form a smooth slide contact between the resilient boss and the skin.

9. The sealing apparatus of claim 7, wherein the resilient boss has an attaching boss protruding laterally from a lower end thereof to increase an attaching force between the core and the skin.

10. A sealing method, comprising:
    injecting a core and a vacuum forming mold to form a skin, wherein the vacuum forming mold and an upper mold are operated integrally;
    combining the upper mold and a lower mold used during injection-molding and foaming of the core;
    injection-molding the core between the upper mold and the lower mold; and
    forming a resilient sealing unit with the core to attach to core and the skin while the lower mold in which the core is formed and the vacuum forming mold in which the skin is formed are combing using a resilient restoring force.

11. The method of claim 10, further comprising:
    continuously forming the resilient sealing unit along a periphery of the core to attach a periphery of the core and a periphery or the skin.

* * * * *